J. C. DAY.
HEADLIGHT.
APPLICATION FILED APR. 20, 1916.

1,212,748.

Patented Jan. 16, 1917.

WITNESSES

INVENTOR
James C. Day
BY
ATTORNEY

UNITED STATES PATENT OFFICE.

JAMES C. DAY, OF MONTPELIER, OHIO.

HEADLIGHT.

1,212,748. Specification of Letters Patent. Patented Jan. 16, 1917.

Application filed April 20, 1916. Serial No. 92,505.

*To all whom it may concern:*

Be it known that I, JAMES C. DAY, a citizen of the United States, residing at Montpelier, in the county of Williams and State of Ohio, have invented certain new and useful Improvements in Headlights, of which the following is a specification.

This invention relates to headlights and more particularly to a headlight such as is used on a locomotive; the primary object being to provide a means for preventing the glass panel in the headlight from being broken by the jar and vibration or by the heat from the light.

As a further object of the invention the device contemplates the provision of a ventilator whereby the circulation of air through the headlight will cool the glass and prevent the breaking thereof.

The invention further aims to provide means for cushioning the glass panel in a manner that will absorb the vibrations of the headlight and thus preserve the glass and prolong its usefulness.

The invention also aims to provide a means for holding the glass in place in the headlight in a manner that will allow the glass to be easily and quickly removed and so situated that the closure in the front of the headlight may be employed as a fastening means for the glass panel.

A further object of the invention is the provision of a means for mounting the glass panel in a headlight which will consist of comparatively few parts and will be simple in construction, and inexpensive to manufacture.

Figure 1:
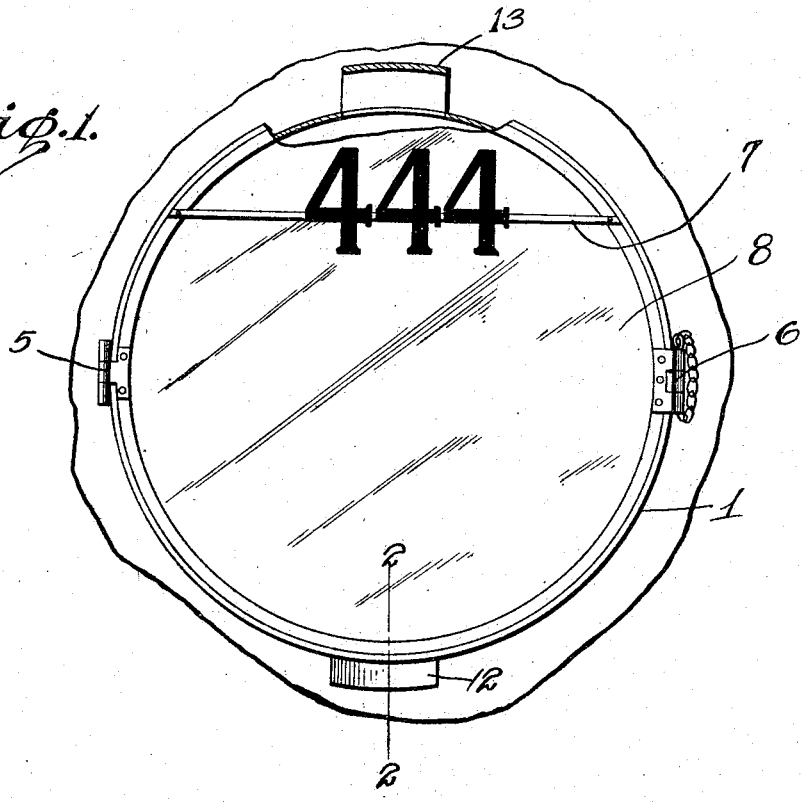
Figure 2:
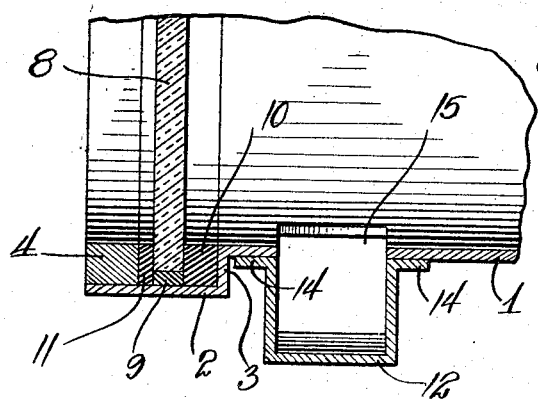

For a full description of the invention and the advantages and merits thereof, reference is to be had to the following description and the accompanying drawings, wherein is illustrated the preferred form of my invention, in which;

Figure 1 is a front elevation of a headlight, the upper ventilator shown in section. Fig. 2 is a fragmentary vertical section on the line 2—2 of Fig. 1.

The body 1 of the headlight is provided with an enlarged annular flange 2 at its forward end which is connected to the main body 1 by the wall 3. The door or closure 4 of the headlight is hingedly mounted on the hinge 5 and is provided with a fastening means 6 by which it may be locked in closed position. Across the top of the door or closure 4 is a bar 7 upon which the numbers of the locomotive are fastened.

The glass panel 8 is mounted in the enlarged forward end of the headlight and interposed between the periphery of the glass panel 8 and the flange 2 is a rubber cushioning ring 9, being designed to absorb the vibration of the headlight and preventing the glass from being broken while the locomotive is in motion; the cushioning rings being of elastic material will contract when the glass panel expands from the heat of the headlight and therefore allow the expansion of the glass without danger of its being cracked or broken by expansion. An annular gasket 10 of rubber or similar elastic material is interposed between the wall 3 and the glass panel 8 contacting with the glass panel around its edge. The frame of the closure 4 is provided with an annular elastic ring or gasket 11 which contacts with the opposite edge of the glass panel when the door is closed. The two elastic gaskets 10 and 11 operate to absorb the lateral shocks which occur in the glass panel while the locomotive is in operation and also allow for the expansion of the glass when it is heated by the light.

Ventilators 12 and 13 are mounted upon the body of the headlight, one on the bottom and one on the top. Each ventilator consists of a housing which has an opening at both ends and is provided with flanges 14 for securing the housings. Each housing is mounted over an opening 15, one opening being in the bottom and a similar opening being formed in the top, the ventilation of the headlight being accomplished by the intake of cool air through the ventilator 12 and the egress of heated air through the ventilator at the top of the headlight. This ventilation provides for the cooling of the glass which becomes heated by the light within the headlight, and the cracking or breaking of the glass is thereby prevented.

From the foregoing it will be observed that a very simple and durable headlight has been provided, the details of which embody the preferred form. I desire it to be understood, however, that slight changes or modifications in the minor details of construction may be made without departing from the spirit of the invention or the scope of the claims hereunto appended.

I claim:

1. In a headlight, the combination with a cylindrical body having an enlarged annular end connected by an annular wall to the body, a glass panel arranged in the enlarged end and slightly less in diameter than the enlarged end, a cushioning ring of the same width as the thickness of the panel, said ring surrounding the periphery of the panel whereby the expansion of the panel is permitted, the edge of said panel being spaced away from the said connecting wall for providing an annular space in said enlarged end, an annular gasket of resilient material arranged in the said space for relieving said panel of lateral vibration, and a closure for the enlarged end for holding said panel in proper position in said enlarged end.

2. In a headlight, the combination with a cylindrical body having an enlarged annular end connected by an annular wall to the body, a glass panel arranged in the enlarged end and slightly less in diameter than the enlarged end, a cushioning ring of the same width as the thickness of the panel, said ring surrounding the periphery of the panel whereby the expansion of the panel is permitted, the edge of said panel being spaced away from the said connecting wall for providing an annular space in said enlarged end, an annular gasket of resilient material arranged in the said space for relieving said panel of lateral vibration, a closure for the enlarged end for holding said panel in proper position in said enlarged end, and an elastic ring carried by said closure and of the same inner and outer diameter as the said annular gasket, said elastic ring contacting with the panel when said closure is closed for aiding said gasket in relieving the vibration of said panel and for permitting the easy extraction of said panel when said closure is open.

In testimony whereof I affix my signature in presence of two witnesses.

JAMES C. DAY.

Witnesses:
JAY W. KIMMELL,
CHARLES R. MASON.

Copies of this patent may be obtained for five cents each, by addressing the "Commissioner of Patents, Washington, D. C."